(12) United States Patent
Grosswig et al.

(10) Patent No.: US 6,547,435 B1
(45) Date of Patent: Apr. 15, 2003

(54) DEVICE FOR MONITORING TEMPERATURE DISTRIBUTION ON THE BASIS OF DISTRIBUTED FIBER-OPTIC SENSING, AND USE OF SAME

(75) Inventors: Stephan Grosswig, Jena (DE); Katrin Kühn, Jena (DE)

(73) Assignee: GESO Gesellschaft für Sensorik, Geotechnischen Umweltschutz und Mathematische Modellierung mbH Jena, Jena (DE)

(*) Notice: Subject to any disclaimer, the term of this patent is extended or adjusted under 35 U.S.C. 154(b) by 0 days.

(21) Appl. No.: 09/700,078
(22) PCT Filed: May 7, 1999
(86) PCT No.: PCT/EP99/03162
§ 371 (c)(1), (2), (4) Date: Nov. 10, 2000
(87) PCT Pub. No.: WO99/60360
PCT Pub. Date: Nov. 25, 1999

(30) Foreign Application Priority Data

May 15, 1998 (DE) ..................................... 298 08 836 U
Jul. 1, 1998 (DE) ..................................... 298 11 737 U

(51) Int. Cl.[7] .......................... H04B 10/08; G01J 5/08; G01K 3/00; G01K 13/00; G02B 6/00
(52) U.S. Cl. .................. 374/137; 374/143; 250/227.14; 385/12
(58) Field of Search ................. 374/136–137, 374/161, 141, 143, 147, 130, 131, 132; 250/227.14, 227.11; 73/61–62; 385/100, 12

(56) References Cited

U.S. PATENT DOCUMENTS

| | | | |
|---|---|---|---|
| 4,547,869 A | * 10/1985 | Savit | 367/149 |
| 4,857,831 A | * 8/1989 | Davies et al. | 324/65 CR |
| 5,453,944 A | * 9/1995 | Baumoel | 364/578 |
| 5,663,490 A | 9/1997 | Kozen | |
| 5,844,927 A | * 12/1998 | Kringleboth | 372/6 |
| 5,896,926 A | * 4/1999 | Hama et al. | 166/250.07 |
| 5,991,479 A | * 11/1999 | Kleinerman | 385/31 |
| 5,995,686 A | * 11/1999 | Hamburger et al. | 385/12 |
| 6,269,198 B1 | * 7/2001 | Hodgson et al. | 385/13 |
| 6,281,489 B1 | * 8/2001 | Tubel et al. | 250/227.14 |
| 6,288,975 B1 | * 9/2001 | Frederick et al. | 367/149 |
| 2002/0043369 A1 | * 4/2002 | Vinegar et al. | 166/250.07 |

FOREIGN PATENT DOCUMENTS

| | | |
|---|---|---|
| DE | 195 09 129 A1 | 8/1996 |
| DE | 196 21 797 A1 | 12/1997 |
| DE | 197 02 126 A1 | 4/1998 |
| DE | 298 11 737 U1 | 10/1998 |
| DE | 198 21 223 U1 | 5/1999 |
| JP | 03158728 A * | 7/1991 .................. 374/117 |

OTHER PUBLICATIONS

Patent Abstracts of Japan, vol. 096, No. 004, Apr. 30, 1996 & JP 07 317215 A (Kajima Corp), Dec. 5, 1995.

* cited by examiner

Primary Examiner—Diego Gutierrez
Assistant Examiner—Gail Verbilsky
(74) Attorney, Agent, or Firm—Friedrich Kueffner

(57) ABSTRACT

The invention relates to a method and a device for monitoring, also permanently and automatically, temperature distributions and/or temperature anomalies on the basis of distributed fiber-optic temperature sensing as well as to the use of such methods. According to the invention the detection of local temperature extremes, i.e. minimums or maximums, in view of the evaluation is performed by an evaluation without numeric derivations. With the device for monitoring ascending and supply pipes surrounded by an annular space it is possible to check the safety of pressurized installations, particularly in the field of low-pressure gas storage, in a cost-efficient manner. Moreover, the position of an underground watershed or respectively the direction and flow rate of the flows in flooded drift sections can be determined on the basis of fiber-optic temperature measurements. The defined arrangement of preferably vertical sensor cables inserted into the bores also makes it possible to examine the tightness of base sole and lateral walls in building excavations. Finally, the virtually horizontal, meander-shaped arrangement of fiber-optic cables situated in several levels makes it possible to evaluate and control the efficacy and homogeneity of leaching processes in leaching dumps and fills.

5 Claims, 5 Drawing Sheets

$V_i$ flow rate
$T_w$ water temperature
$T_Q$ point source temperature
$t$ time

DEVICE FOR MONITORING TEMPERATURE DISTRIBUTION ON THE BASIS OF DISTRIBUTED FIBER-OPTIC SENSING, AND USE OF SAME

BACKGROUND OF THE INVENTION

1. Field of the Invention

The invention relates to a method and a device for monitoring temperature distributions and/or temperature anomalies on the basis of distributed fiber-optic temperature sensing as well as to novel applications of such methods.

2. Description of the Related Art

Distributed fiber-optic measurement principles use the integration of laser light impulses into an optical waveguide and the scattering effects thereof. The scattering of the laser light impulse takes place on the molecules of the optical waveguide. A small part of the laser light is thereby scattered back. The intensity and the spectral composition of the scattered light is accordingly determined by the molecules in the optical waveguide and by the behavior of the molecules.

The backscattered light is composed of different spectral portions, which are caused by different mechanisms of the interaction between laser light and the optical waveguide components and which thereby also include different information on the physical state of the optical waveguide. Thus, however, the optical waveguide itself turns into a sensitive element.

The Rayleigh backscatter component, which has the same wavelength as the integrated primary laser impulse, provides the highest peak in the scattered light spectrum and thereby essentially determines the exponential drop of the intensity time curve of the backscattered light. As inhomogeneities in the optical waveguide, local attenuation changes, micro ruptures, splice connections and the like cause the intensity in the Rayleigh backscatter component to change, said component of the scattered light spectrum is used for controlling the quality of optical waveguides or for error detection, respectively.

The interaction of the laser light with optical phonons in the optical waveguide, i.e. the scattering of the phonons on thermal grid vibrations in the material, is the cause for the Raman backscatter components.

The Raman scattered light consists of two components, the so-called stokes line and the anti-stokes line. Said two spectral lines lie symmetrically to the peak of the Rayleigh backscatter, shifted by a certain amount of the wave number. While the intensity of the stokes line $I_S$ shifted to smaller wave numbers is virtually temperature-independent, the anti-stokes line $I_A$ shifted to higher wave numbers is clearly dependent on the temperature, whereby the utilization of the Raman backscatter is pre-destined for the distributed temperature measurement.

The sole consideration of the information contained in the backscatter spectrum of an optical waveguide does not yet provide any information on the local distribution along the optical waveguide. The so-called OTDR method is used for backscatter measurements for the locally resolved detection of the attenuation by means of the Rayleigh scattering. In order to be able to realize a distributed, i.e. locally resolved detection of the temperature by means of the Raman sensing mechanism, either the aforementioned OTDR method (Optical Time Domain Reflectometry) is used as time domain reflectometry measurement or the OFTR (Optical Frequency Domain Reflectometry) is used as frequency domain reflectometry measurement.

The OTDR method is based on a pulse/echo principle, i.e. the intensity (scatter level) and the place of origin (scatter location) of the backscattered Raman light are determined on the basis of the time interval between sending and detecting the light impulses.

The alternative OFTR technology enables a quasi permanent operation of the laser and a narrow-band detection of the optical backscatter behavior. The so obtained advantages enable the use of more inexpensive laser light sources and cost-saving electronic components for the signal detection. In contrast thereto, however, the more problematical measurement of the scattered light and a signal processing with higher linearity requirements, which is more laborious due to the Fourier transformation, have to be taken into account.

The German laid-open print DE 195 09 129 A1 discloses a method and a device for controlling and monitoring the state of pipes, containers, pipelines and the like.

According to said teaching it is assumed that the liquid or gaseous media contained in said pipes, containers or pipelines have a different media temperature relative to the direct ambience. The ambient temperature distribution is determined at least above sections along and/or peripheral of and/or in the bottom region close to the pipes, containers, pipelines or the like, however, externally of the media space enclosed thereby.

Said temperature determination is performed with an elongated distributed temperature sensor in the form of a fiber-optic sensor cable for detecting the temperature on the basis of the aforementioned principles. If a local anomaly in the temperature distribution is detected, a leakage is assumed and the location, the direction of spreading and the leakage quantity are then determined from the temperature distribution at the respective location of the anomaly or the changing location of the anomaly.

In respect of the device according to DE 198 09 129 A1 the elongated temperature sensor, i.e. the fiber-optic sensor cable is arranged directly at or adjacent over a predetermined clearance within a pipe trench or a pipe bridge longitudinally of the pipe at the circumference of the outer surface of said pipe.

With substantially horizontally extending pipes, pipelines or the like the elongated sensor is fixed underneath the pipes. In this respect it is useful to also fix a plurality of temperature sensors or cables, which extend essentially parallel, parallel to the longitudinal axis underneath thereof so that the spreading direction and the spreading quantity of a media discharge caused by a leakage can be determined. At particularly endangered spots the aforementioned solution suggests to provide several or more densely arranged temperature sensors in order to also identify smallest leakages with a high location-related measurement accuracy.

The basis for leakage detection is the knowledge that a penetrating medium having a higher or lower temperature in relation to the ambient temperature results in a local temperature change, which also includes the direct ambience of the pipe or container jacket.

The advantageously used fiber-optic sensor cables known per se can evaluate the time interval and intensity of backscattered light with cable lengths of up to 10 km, arriving at a temperature resolution of 0.1° C. The given resolution of the location lies within 1 and 0.25 m in response to the length of the sensor cable and the selected method.

The German utility model G 93 18 404 discloses a device for determining temperatures on or in extended measurement objects, wherein the system shown therein uses an optic-electronic measurement device. Said known measurement device feeds a laser impulse on at least one end of an optical waveguide and serves to examine the radiation backscattered by the optical waveguide. Due to the already explained interactions the temperature and the location can then be evaluated longitudinally of the optical waveguide in dependence on the spectrum and the time interval, wherein the longitudinal coordinates of the optical waveguide can be associated with corresponding temperature values.

For localizing leakages particularly in ascending or supply pipes of underground gas accumulators, so-called flow meter measurements have become known, wherein the gas flow from the surrounding annular space into the actual bore hole is detected. Back-pipe effects cannot be determined by means of flow measurements, as such effects do not entail a gas flow within the piping. The local resolution of known flow meter measurements is determined by the respective discrete depths in which the measurement is carried out and is, therefore, basically small.

Moreover, it has already been suggested to seal the annular spaces one after the other in selected deep areas in order to perform pressure measurements. In this case, however, merely the incoming gas flowing into the actual piping is determined, and the local resolution is small in dependence on the sealing steps. Furthermore, the costs for such pressure measurements are considerable.

For testing the tightness of the base sole and lateral walls of or in building excavations, respectively, individual bores are provided in the excavation in order to detect in one after the other the temperature by means of a lance, the tip of which is provided with a temperature sensor. In other words, the temperature is determined at the bases of the individual bores by means of the lance and the temperature sensor provided thereon. The detection of a temperature development in terms of time is not possible or only with problems. The surface-related temperature plot produced at the end of the measurements performed in the known manner is hard to interpret as the temperature values were not determined at the same time. The water has to be pumped out of the building excavation until the measurement of all bores is completed. Given a large building excavation this results in high pumping times, wherein the disadvantage of the cited known solution moreover consists in that monitoring of the vertical wall is not possible or only realizable with restricted quality.

As was mentioned above, the fiber-optic temperature sensing mechanism is excellently suited for monitoring pipelines such as product pipelines, distant heating pipes etc. and in this respect particularly for the detection of leakages. The development of the temperature in terms of time or the temperature itself contains information on the current operating state of the monitored pipeline. Leakages result in local temperature anomalies, which develop within a short time, i.e. within a few minutes up to hours. Said anomalies are detected and located by means of the described measuring method relating to fiber-optic temperature sensing. Temperature deviations depending on the time of day and year or on the weather are at all times spacious appearances with a relatively long-time constant. In contrast to other temperature deviations the leakages can be detected and located by the spacial limitation and their development in terms of time. The response time of the used leakage detection systems depends on a plurality of technical parameters such as the leakage rate, the kind of product, the pressure, temperature, the quality of the ground, the local and temperature resolution of the fiber-optic temperature measuring technology and others. The response time of the leakage detection system required for respective use determines the time interval $\tau$ with which the temperature profiles have to be determined. As large quantities of data have to be processed by taking into account reference values in each case, and as it is necessary to constantly remove natural temperature variations from the current measuring values, known evaluation methods require a lot of time and/or calculations, so that an online evaluation is partially not possible or only with restrictions.

SUMMARY OF THE INVENTION

According to the above it is the object of the invention to provide a method for monitoring, also permanently and automatically, temperature distributions and/or temperature anomalies on the basis of distributed fiber-optic temperature sensing, which permits to improve the evaluation of the measured values and to simultaneously increase the accuracy of the information provided by the measurements. Moreover, the method to be provided is to be suited for long-time tests and is to securely detect local extremes without requiring laborious numeric derivations.

Another object of the invention resides in providing a device for monitoring temperature distributions and/or temperature anomalies, in particular of ascending or supply pipes for underground gas accumulators surrounded by an annular space, by means of fiber-optic sensor cables for determining the temperature distribution, which results in an inexpensive high local resolution of the respective measurements or leakage detections and which excludes the safety risks in the continued or uninterrupted storage operation.

Another object of the invention resides in the provision of a method for monitoring on the basis of distributed fiber-optic temperature sensing, in particular for proving the tightness of base sole and lateral walls in building excavations or similar facilities, wherein pumping times are to be cut shorter and wherein by means of a virtually simultaneous measurement information on defects in the base sole and the wall elements of the excavation are obtained in a highly precise and fast manner.

Another object of the invention resides in detecting underground water flows and/or the position of a watershed by means of fiber-optic temperature sensing, without having to work with means or so-called tracers which are hazardous to the environment.

Finally, it is an object of the invention to open up new application fields in connection with fiber-optic temperature sensing, whereby especially chemical or micro-biological leaching processes or methods are to be taken into account.

The solution to the object of the invention in view of the long-time monitoring is provided with a method comprising the steps of:

determining a sum of naturally existing temperature variations during the normal operation of a corresponding measuring device and deriving reference profiles thereof;

generating a matrix $A_{ij}$ having a size defined by the number of the longitudinal sections of the sensor cable $I=L/\Delta x$ and the number J of the reference profiles;

executing individual profile measurements at short time intervals and forming a mean value profiles thereof;

deriving the current profile $T_{i,t,n,w,n}$ from the mean value profile and storing said profile in a table;

evaluating the current stored profiled stepwise for all j-values, i.e. by comparison with the different reference values $T_{Ref,i,j}$, wherein the resulting temperature differences $\Delta T(X_i)$ for all longitudinal sections i are checked for a deviation larger than a threshold value $\partial$ (noise);

determining whether the deviations exist for one or more i-values, and checking wether the deviations exist in a plurality of adjacent longitudinal sections, wherein in case of existence of comparable temperature deviations from the reference values of the profile large-surface temperature changes are concluded in the positive case and a leakage is concluded in the negative case. Reference is made to the individual claims and the description as far as partial objects to be solved are concerned.

With the method according to the invention for monitoring, also permanently and automatically, temperature distributions and/or temperature anomalies, at first a determination of a quantity of naturally existing temperature variations during the normal operation and the derivation of so-called reference profiles based thereon is assumed.

In the following, a matrix $A_{ij}$ having a size defined by the number of the longitudinal sections of the sensor cable and the number of reference profiles is generated.

Within short time intervals individual profile measurements are then performed, whereof a mean value profile is determined. A current profile is then determined from the mean value profile, and said current profile is stored, preferably in a table.

Additionally the current, stored profile(s) is/are then evaluated step by step in view of all individual values by comparing them with the different reference profiles, whereby the temperature differences resulting for all longitudinal sections are then examined for a deviation larger than a threshold value.

Thereafter it is determined, whether the deviations exist for one or more values, and it is examined whether the deviations have occurred for a plurality of adjacent longitudinal sections. If comparable temperature deviations from the reference values of the profile exist, spacious temperature changes are concluded in the positive case, and a leakage in the negative case.

Accordingly, the current temperature profile $T(x_i,t)$ is compared with different reference profiles and evaluated by means of criteria to be defined. In this respect $x_i$ designates the longitudinal coordinate of the individual measuring intervals $[x_i-\Delta x/2, x_i+\Delta x/2]$ of the sensor cable, wherein $\Delta x$ is the local resolution of the measuring system.

The essential values to be modified in view of the respective monitoring task relate to the threshold value $\partial$ for the temperature difference $\Delta T(x_i)=T(x_i,t)-T_{Ref}(x_i)$ and the time interval $\tau$ between the measurements of the temperature profiles.

The temperature profiles measured at time t-$\tau$ as well as reference data with corresponding static information contents serve as reference profiles $T_{Ref}$.

Said reference data are permanently updated and statistically evaluated during the operation of the respective system. They contain local information on the temperature deviations in view of daytime and season as well as climatic influences. The permanent updating and the expansion of the catalogue of the reference profiles make the system self-learning, and it independently adjusts to the individual situations.

In view of the time dynamics of the measurements it must be noted that the used fiber-optic sensor cable results in a short delay of the temperature measurement due to its construction, which can last up to several minutes in dependence on the thermal contact with the ambient medium. The leakage itself normally develops very fast at first, in order to slowly change into a quasi stationary state thereafter. According to the invention said property is used for the selection of the time intervals between the individual measurements of the temperature profiles, in order to optimize the calculation work and to shorten the time for evaluation.

According to the invention natural temperature variations are constantly removed from the updated measured values by means of correction so that temperature anomalies deriving from the actual leakages clearly stand out in the temperature difference profiles ($\Delta T(x_i)$). This takes place by the comparison with the measured values, which were measured shortly before or also some time ago. If there are no precise results it is additionally possible to use so-called historic data lying further back, which were determined successively in the course of longer measurements.

In view of the processing of historic data the calendar year is preferably divided into 52 annual weeks in order to be able to refer to precise reference data, which account for the seasonal temperature variations. The remaining day, two in leap years, is, for instance, added to the last calendar week of the year. At time intervals $\tau$, for example, $\tau=1$ h, the current temperature profiles $T_{i,t,n,w,N}$ are then continuously measured and stored. The indices thereby refer to:

i=longitudinal section
t=time
n=week day
w=running number of the calendar week
N=current year since the monitoring system started to operate.

The stored values serve the comparison of the current temperature profile with the previous temperature profiles in order to form difference values $\Delta T(x_i)=T_{i,t,n,w,N}-T_{Ref,i}$ thereof.

If local, i.e. for a few adjacent $x_i$ temperature differences occur, which are larger than the predefined response threshold $\partial$, said temperature anomaly indicates a leakage.

The mean temperature measuring values being representative for each week of the year as well as supplementary some selected statistic values are transferred into a data base according to the invention, the data field of which results from the reference time or daytime, respectively, and to the individual calendar weeks.

Each data field then contains the following stored values:
1. the running number of the current year N (N=1,2,3 . . . ) since the monitoring system started to operate;
2. the updated mean value $<T_{i,r,w}>_N$ of the weekly mean value of the temperature $<T_{i,r,w,N}>$ for all longitudinal coordinates $x_i$ and for all reference times $r=t_{Ref}$ $$\langle T_{i,r,w,N} \rangle = \frac{\langle T_{i,r,w,N} \rangle + (N-1) \cdot \langle T_{i,r,w} \rangle_{N-1}}{N} \quad (1)$$

$$mit \langle T_{i,r,w,N} \rangle = \frac{1}{7} \sum_{n=1}^{7} T_{i,r,n,w,N}; \quad w = 1, \ldots, 52$$

wherein $<T_{i,r,w,N}>$ is in each case calculated upon the expiration of the last calendar week w;

3. the updated mean value $<\sigma^2_{i,r,w}>_N$ of the square deviation of the weekly temperature mean value from the updated temperature mean value $<\sigma^2_{i,r,w,N}>$ for all longitudinal coordinates $x_i$ and all reference times $r=t_{Ref}$ $$\langle \sigma^2_{i,r,w,} \rangle_N = \frac{\langle \sigma^2_{i,r,w,N} \rangle + (N-1) \cdot \langle \sigma^2_{i,r,w} \rangle_{N-1}}{N}. \quad (2)$$

with $<\sigma^2_{i,r,w,N}>=(<T_{i,r,w,N}>-<T_{i,r,w,}>_N)^2$.

The values shown in equations (1) and (2) accordingly contain information on the naturally existing temperature variations during the normal operation of, for instance, a pipeline and can be used for evaluating currently measured temperature fluctuations. The date themselves can be updated step by step in the course of the year or within other pre-definable time segments.

In a supplementary step it is possible to check by means of the preceding sign of the detected anomaly whether the expected physical effect has been provided, in order to then correct or respectively expand the matrix elements for the ongoing performance of the method.

In view of the monitoring of ascending or supply pipes surrounded by an annular space for underground gas accumulators by means of fiber-optic sensor cables, said sensor cable is arranged inside the ascending or supply pipe and/or a high-pressure gas pipeline for determining the temperature distribution or for detecting anomalies. The sensor cable is passed towards the outside via a pressure-proof sealing. Moreover, a device or means are provided for the temporary relief of the pressurized annular space and/or the ascending pipe in order to relieve either the pressurized annular space or the ascending pipe space itself once the initial state of the temperature distribution has been determined. Said pressure relief takes place only for a short time so that the storage operation is not considerably interrupted.

A measuring unit for feeding radiation impulses and for receiving Raman backscatter radiation is connected to the exterior end of the here used fiber-optic sensor cable.

According to a preferred embodiment a weighted body is fastened to the interior end of the sensor cable to be lowered into the pipe, allowing the cable to be arranged in the pipe in a freely suspended manner. Also the arrangement of a cable end box or terminal box is possible, such as is described in DE 43 04 546 C1.

In the case, where a defined position of the sensor cable in the interior of the pipe is desired due to measurement-technical or other reasons, springy spacers are attached to the sensor cable section by section, which upon inserting the sensor cable inside the pipe secure a position thereof that is predefined or can be predefined.

The springiness of the spacers makes sure that the sensor cable can also be inserted via a pressed air lock having only a small diameter. In the relaxed state the springy spacers have a position essentially vertical to the longitudinal axis of the sensor cable or extend from said axis to the inside wall of the ascending or supply pipe in a vertical direction.

The temperature anomalies detected by the device in measured temperature profiles supply information on leakages in the piping or on flow processes in the rear area of the pipe, i.e. in the so-called annular space. As is shown by the device, this is surprisingly also possible if the sensor cable is installed in the supply pipe. Coolings, i.e. temperature changes in the annular space or the cementation have a backwards effect into the supply pipe via heat conduction processes and can be measured by means of the fiber-optic temperature sensing mechanism, evaluated with the aforementioned method and located.

In view of the evaluation, a differential curve of the temperature profiles is determined prior to and after the relaxation of the annular space to be effected, wherein said curve shows anomalies with differed preceding signs. Negative temperature differences imply leaky pipe bells, whereas positive temperature differences and anomalies show the incoming flow of warmer gas in the rear area of the pipe due to a damaged cementation or sheathing.

Therefore, the described device enables a simultaneous, distributed measurement of the temperature depth profiles alongside of the total accumulator bore in natural gas accumulators with high local and temperature resolution given a large sensor cable length. The detectable temperature range lies inbetween $-50°$ C. up to more than $350°$ C. at pressures of up to 75 MPa.

An influence of the storage operation through the inventive device is excluded. Due to the fact that the sensor cable has no potential- or current-carrying wires whatsoever, there is no explosion hazard right from the beginning. The used fiber-optic sensor cables of the device are mechanically and chemically extremely resistant and have a long lifetime. The fiber-optic sensor cables may remain in the interior of the pipe permanently and enable critical date measurements and permanent monitoring by connection to electronic data processing control rooms.

Alternatively a temporary installation of the sensor cable into the bore of a gas accumulator is possible, whereby the sensor cable is inserted into the pressurized bore by means of pressed air locks for sealing the bore during the installation of the cable and during the actual measurements. Here, too, the pressurized annular space or the ascending pipe is relieved upon the determination of an initial temperature state, and a new temperature detection takes place. Measurements can be made in aquifer storages as well as in a cavern or in exploited deposits for the storage of gas.

It has shown that a local allocation of leakages up to an accuracy of 0.25 m can be achieved with the proposed device, so that an exact determination of defect or leaky parts can be performed by means of a given piping scheme. By means of an additional sensing mechanism in the able terminal box or cable end box further physical parameters can be detected. By arranging a geophone in or on the box, the gas/water contact during the insertion of the sensor cable can be determined in an advantageous manner, and an undesired swinging of the loom of cables with possibly resulting damages due to abruptly changed pressure conditions can effectively be prevented.

When laying the sensor cable in the interior of a high-pressure gas pipeline, which, for example, leads through a densely populated area where earth works are not possible or only with problems, a composite cable having a plurality of optical waveguides is used in order to obtain a data transmission, particularly for telecommunication purposes, in addition to the leakage detection.

With the inventive method for proving the tightness of base sole and lateral walls in building excavations or the like installations on the basis of distributed fiber-optic temperature sensing, at first a grid-like executed number of bores is inserted down to the base sole in correspondence with the geometry of the excavation. Temperature probes are then inserted into said bores and the probe measuring results are read out.

If an anomaly is detected it is possible to switch the measurement from a coarse grid to a fine grid in order to be able to locate the leakage more exactly.

Furthermore, bores are inserted in the direct proximity of sheet pilings and subterraneous curtains in front of the joints of the individual wall elements, whereby said bores reach down to the base sole.

A continuous fiber-optic cable is then introduced into said additional bores, whereby basic weights or weighted bodies are used for said purpose.

After the initial state of the temperature distribution has been determined the water is pumped out of the interior of the excavation and the adjusting temperature distribution is measured in a continuous or cyclic manner. By means of continuous or cyclic comparison with the initial state, leakages can then be concluded online, whereby here, too, the positions of the individual leaky spots can be determined.

According to the invention, the above described method takes into account the existing temperature differences between the water flowing in through a possible leakage and the ambience of the sealing system. In the concrete case of a building excavation base sole heat is generated during the cementation process. Accordingly the temperature in the building excavation can rise to values of more than 20° C. above the base soil sealing. This results in clear temperature differences between the ground water outside the excavation and the water inside the excavation. When pumping the water out of the interior of the building excavation the ground water level is reduced in the sealed building excavation and a hydraulic gradient as well as an additional hydrostatic pressure are created. Said hydraulic gradient has the effect that through a leakage in the base sole, in the vertical walls, i.e. on sheet pilings or subterraneous curtains, and in the area of the base sole/wall connection clearly cooler ground water having a temperature for example of 10 to 13° C. penetrates into the building excavation. By measuring the temperature distribution on the base sole of the building excavation and on the vertical walls, as was described above, during the pumping, leakages can easily and securely be detected in the corresponding sealing installations or systems.

In the further inventive method for monitoring temperature distributions and/or temperature anomalies, in particular for determining flows in excavation waters as well as for determining the behavior of a watershed, again fiber-optic sensor cables are used.

The fiber-optic cable(s) is/are inserted, preferably meander-like, in the drift or in the excavation laterally or extending in a longitudinal direction, however, by covering surface elements as large as possible.

Moreover, a thermal point source is activated preferably in the center of the cable arrangement, whereby on the basis of a detected displacement of the determined temperature profiles relative to the known position of the point source the existence of a flow on one hand but also the flow rate on the other hand can be concluded.

According to the invention the direction of flow of the excavation water can so be determined and the flow rate can be estimated in a flooded drift section being completely filled with water. This takes place with a combination of a thermal point source, e.g. local heating or cooling, and a distributed temperature measurement, i.e. simultaneous measurements of temperature and location. The point source works as a thermal impulse only with a time limit.

It has shown that despite the existing heat conduction in the water, small flow rates can be determined by shifting the determined temperature curve.

The measuring method makes it possible to waive otherwise required tracers, which would entail environmental impacts. By activating the thermal point source anew, the measurement with a once installed fiber-optic cable can be repeated and updated at any time, whereby the monitoring of critical ground water or base sole sections with the purpose of monitoring for example flooded mine installations is possible.

A novel application of the method according to the invention for determining temperature distributions and/or temperature anomalies on the basis of distributed fiber-optic temperature sensing consists in the evaluation of chemical or microbiological leaching processes. In this respect the knowledge is used that the leaching activities take place exothermally and that a control of the leaching process by means of an evaluation of the march of the temperature in a leaching dump or leaching fill becomes possible.

According to the invention meander-shaped fiber-optic sensors are preferably inserted when building the leaching dump or leaching fill, whereby the respective meanders cover the dump or fill surface in a grid-like manner. At least two surface structures more or less forming levels are arranged in the dump or fill on top of each other.

The spacial distribution or the configuration of the meander can take place in the grid of 1, 0.5 or 0.25 m.

By means of a common measuring device the temperature distribution may then be determined both within a level in a planar manner and of the levels arranged on top of each other against one another.

It is according to the invention that, of course, also a spiral-shaped or other planar laying of the sensor cable rather than a meander-like one is conceivable.

With the aid of the inserted fiber-optic sensing mechanism both the local and the temporal structure of the leaching front within the dump or fill can be determined, and it is possible to check whether the leaching is homogeneous. In the case of inhomogeneities fresh substance can purposively be added.

By the arrangement of at least two or more levels of sensors arranged in a planar manner, preferably horizontally one above the other, flows within the fill or dump can be detected and evaluated and used for the evaluation or control of the leaching process.

By means of the simple temporal detection of forming water fronts also the relaxing time after exothermal reactions can be monitored and a new process start can be initiated or also the state of the exhaustion in view of the leaching process can objectively be determined.

As can be inferred from the aforementioned explanations, the evaluation method allows to improve the accuracy especially during long-time monitoring on the basis of determining temperature distributions by means of fiber-optic sensing, wherein, by considering a reference data base, an online evaluation can take place with a small extent of calculations.

By means of said improved evaluation method new cases of application for the distributed temperature measurement can be opened up by means of fiber optics, whereby especially the detection of leakages in ascending or supply pipes in gas accumulators, and also the determination of tightness of the base sole and the lateral walls in building excavations is pointed out in this respect.

It has, moreover, shown that it is possible on the basis of the evaluation accuracy to determine underground flows also with very small flow rates, e.g. in flooded open drift sections. An additional novel case of application resides in the evaluation of exothermal reactions of chemical and/or microbiological leaching processes, so that such methods can be monitored and controlled in situ, with the result that an increased exploitation is achieved with a simultaneous more effective operation of such plants and installations.

BRIEF DESCRIPTION OF THE DRAWINGS

The invention will hereinafter be explained in more detail by means of different embodiments and figures.

DESCRIPTION OF PREFERRED EMBODIMENTS

Figure 1A:
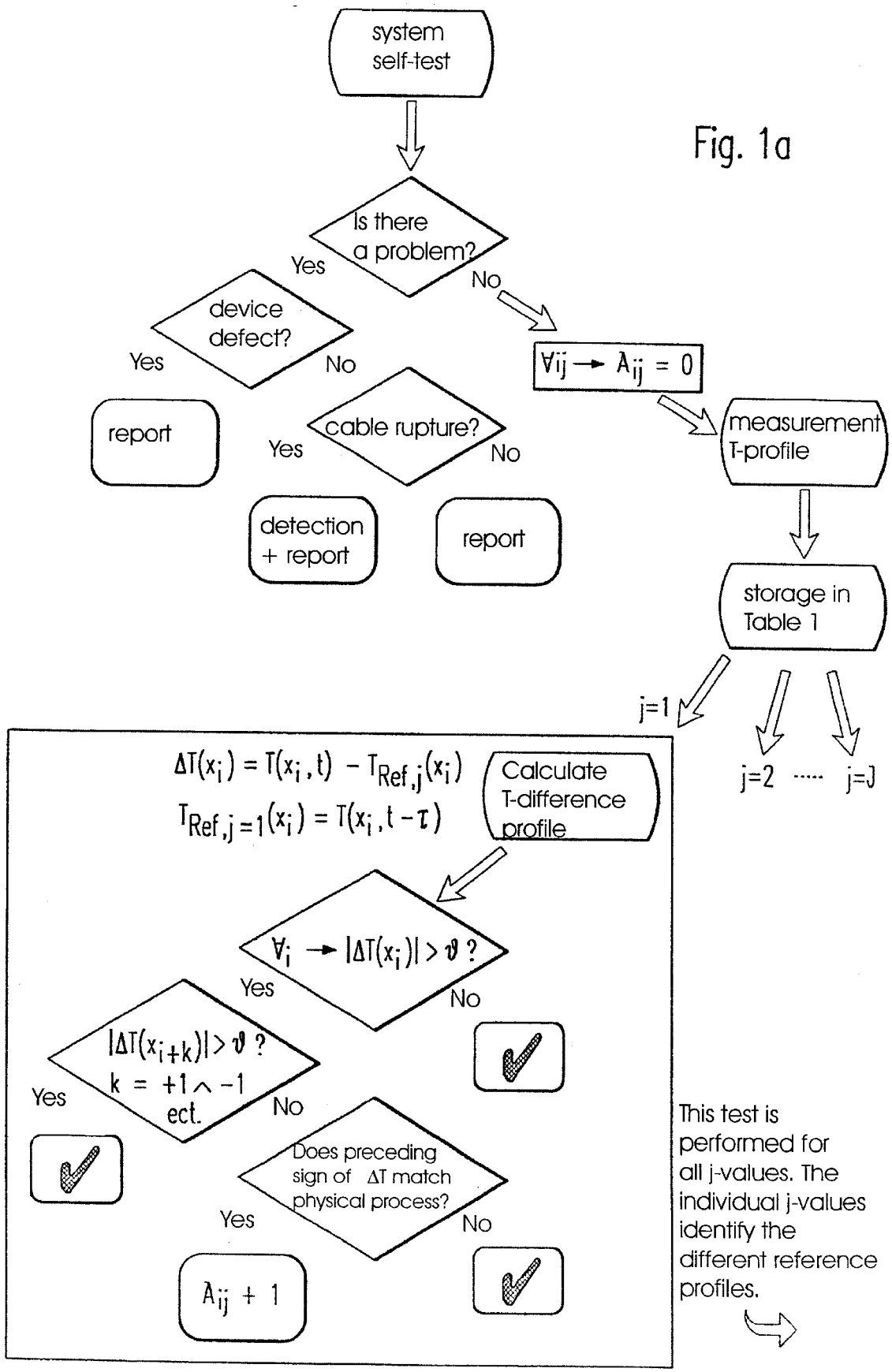
FIGS. 1a and b show a basic illustration of the method for the permanent, automatic monitoring of temperature changes by means of fiber-optic sensing.
Figure 1B:
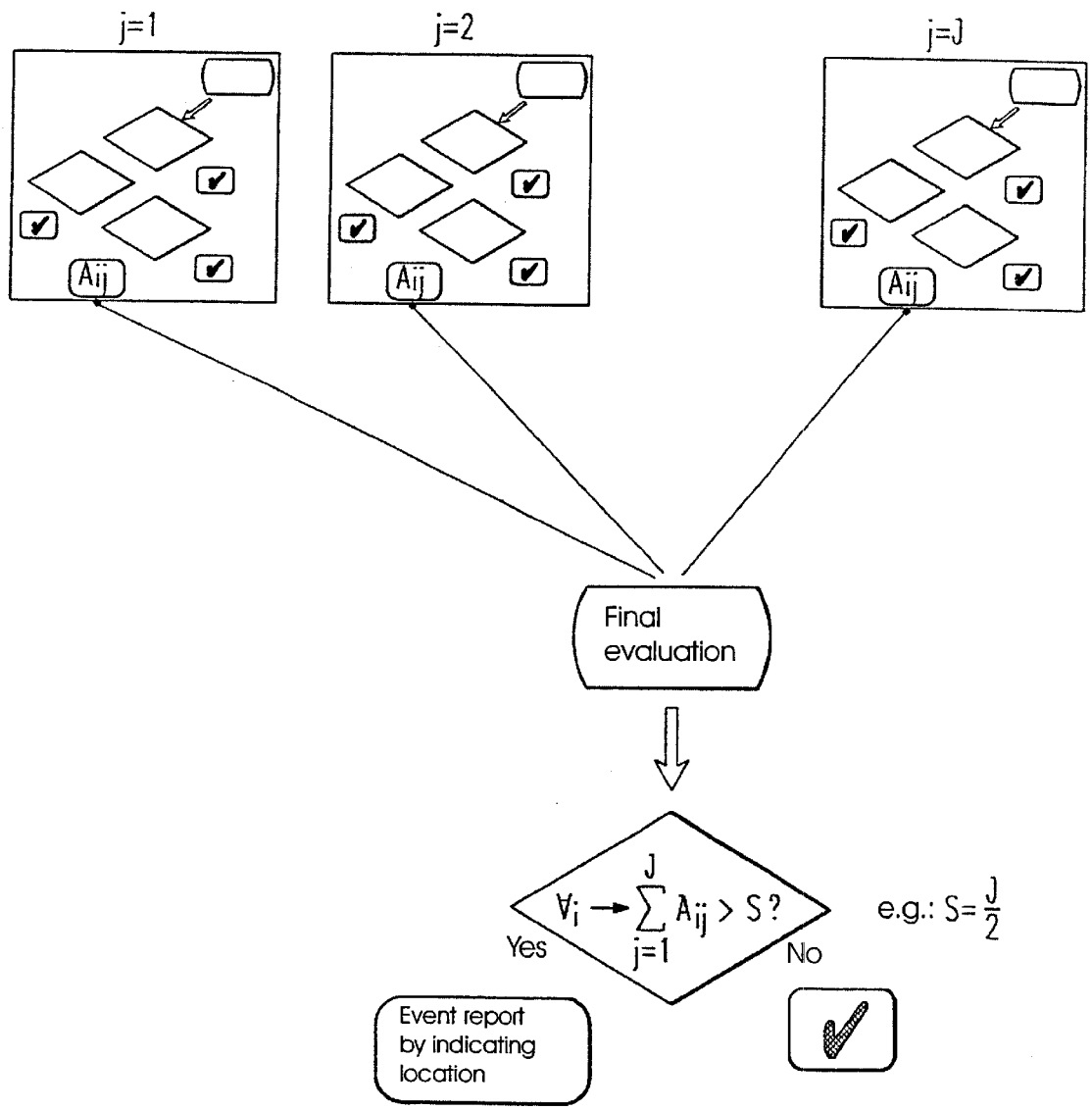

In the embodiment shown in the FIGS. 1a and 1b, at first a preferably provided self-test of a fiber-optic temperature measuring device is assumed. The actual measurement and evaluation of the current temperature profiles takes place after the device has signaled readiness for operation.

According to the embodiment local extremes, i.e. minimums and maximums, are recognized without numeric derivations. Problems are thereby surpassed, which can otherwise occur during numeric differentiation of temperature profiles due to signal noise or the spacial and temporal temperature variations being characteristic for the respective pipeline. The reference profiles $T_{Ref,j}$ required for evaluating the current measuring results are specified and provided with corresponding indices. The selected preadjustments are freely programmable in order to allow for individual adjustments of the monitoring system to the respective measuring task.

An exemplary selection for the time margin between two temperature measurements is, for example, one hour, i.e. $\tau=1$ h.

The following temperature profiles serve as reference data:

$$T_{Ref,1}=T_{i,t-\tau,n,w,N}$$

$$T_{Ref,2}=T_{i,t-24h,n,w,N}$$

$$T_{Ref,3}=T_{i,t,n,w,N-1}$$

A matrix (integer variable) is generated, the elements of which $A_{ij}$ are set at zero. The size of the matrix is determined by the number of the longitudinal sections of the sensor cable $I=L/\Delta x$ and the number J of the used reference profiles, i.e. I×J.

The measurement of the current temperature profile already includes a statistical evaluation, in which individual measurements are executed and evaluated in order to push the noise amplitude clearly under the pre-specified threshold value $\partial$ for the temperature difference $\Delta T(x_i)$. The so obtained mean value of the temperature profiles being close to each other in terms of time is hereinafter called a current temperature profile $T_{i,t,n,w,N}$. In correspondence with the respective time t and the day of the week n said temperature profile is stored in a table.

The subsequent evaluation of the current temperature profile takes place stepwise for all j-values, i.e. by comparison with the different reference profiles $T_{Ref,j}$. The resulting temperature differences $\Delta T(x_i)$ are thereupon examined for all longitudinal sections i, namely for determining whether they deviate from the reference value by more than the threshold value $\partial$. If this applies to one or a few i-values only, it is examined whether said deviations also result in the adjacent longitudinal sections. By means of a logic AND function the different k-values ±1, ±2, ±3, ±5, ±10 and ±20 are inquired. If all of said adjacent longitudinal sections show comparable temperature deviations from the reference values, the specific temperature change refers to a large surface and does not point at a leakage.

If, however, only a few directly adjacent temperature differences are concerned, for example, ±1, ±2, ±3, it is evaluated as a leakage.

In a last step it is examined, whether the detected local temperature anomaly has the preceding sign matching the expected physical effect.

A gas leakage, for instance, is connected with a negative temperature anomaly. In this case, if the preceding sign of the detected temperature anomaly corresponds to the physical process, the matrix element $A_{ij}$ is increased through addition by 1. Moreover, it is provided to generate messages also for those local temperature anomalies, which cannot immediately and unambiguously be physically interpreted. Such temperature deviations can supply important information on the state or the load of the pipeline.

When all j-values have finally been processed, a final evaluation of the matrix elements $A_{ij}$ takes place. The evaluation criteria are basically freely selectable. A threshold value S is preferably specified, which can vary between 1 and J. For each i-value, for which the sum $\Sigma_j A_{ij}$ exceeds the threshold value S, a leakage warning is issued, as can be seen in FIG. 1b.

Figure 2:
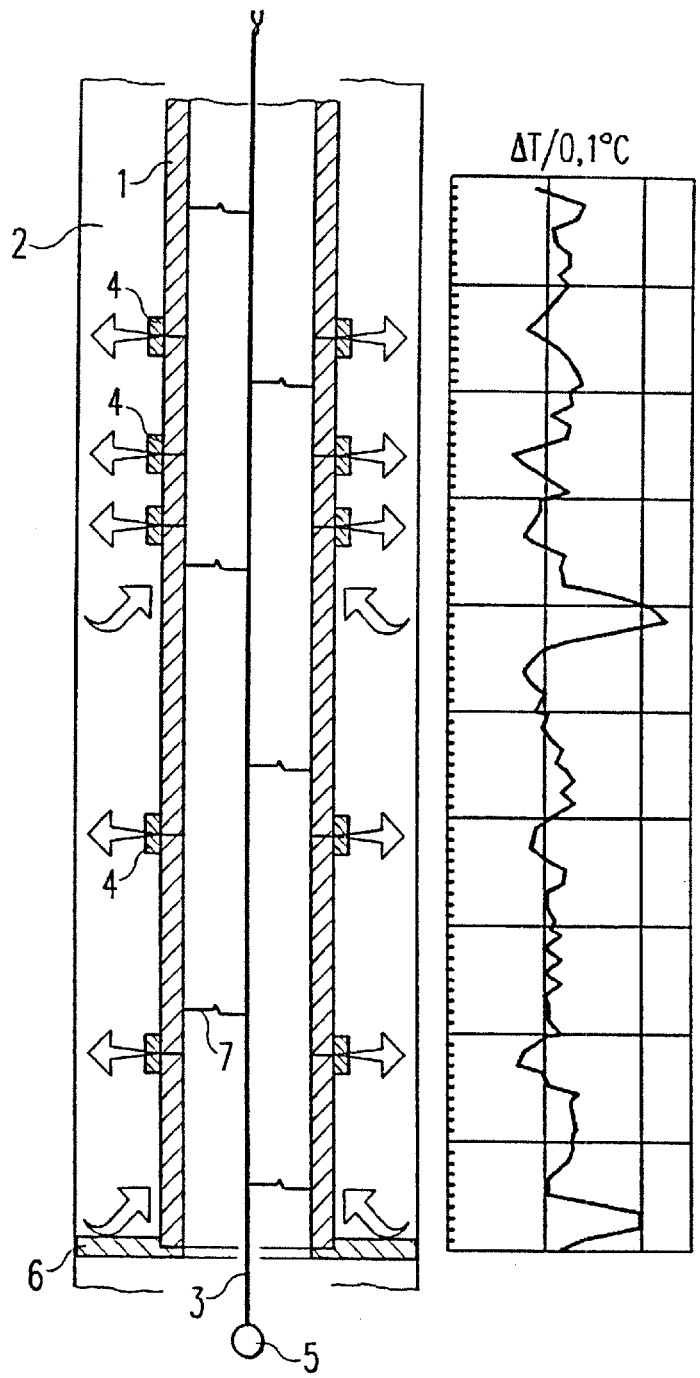
FIG. 2 shows a basic construction of an ascending or supply pipe for an underground gas accumulator with annular sleeves and rear pipe flow as well as a determined differential curve of the temperature profiles prior to and after the annular space relaxation.

The device for the leakage monitoring of an ascending or supply pipe 1 illustrated in FIG. 2 shows a pipe being surrounded by an annular space 2 or a cementation.

A fiber-optic sensor cable 3 is inserted or arranged inside the ascending or supply pipe 1. Said sensor cable 3 has an outer end, which is guided over a non-illustrated pressure-proof sealing.

The ascending or supply pipe 1 is composed of individual sections connected by means of sleeves 4. The mentioned outer end of the fiber-optic sensor cable 3 is passed to a non-illustrated measuring unit for feeding radiation impulses and for receiving backscatter radiation, in particular Raman backscatter, so that the temperature profile can be determined alongside of the sensor cable.

At the inner end of the sensor cable 3 a weighted body and/or a cable terminal box 5 is provided for facilitating the insertion of the cable and for counter-acting the pressure inside the pipe. A packer 6 seals the annular space towards the accumulator lying thereunder.

Spacers 7 can be fastened to the sensor cable 3, which more or less spread or unfold after the insertion of the sensor cable in the interior of the pipe, so that the cable adopts a defined position relative to the pipe 1. For this purpose the spacers 7 are springy, wherein the spacers extend essentially vertically from the longitudinal axis of the sensor cable to the inner wall of the pipe in a relaxed state.

The differential curve of the temperature profiles prior to and after the annular space relaxation illustrated in the right-hand part of FIG. 2 shows the high sensitivity of the fiber-optic temperature measuring technique and the provable anomalies in the temperature distribution with different preceding signs.

Negative temperature differences reveal leaky sleeves 4. Positive temperature anomalies, however, disclose the incoming flow of warmer gas in the rear pipe area due to a defect in the cementation.

By means of the device illustrated and described in the figure, not only a leakage control performed in correspondence with the provided examination criteria can be carried through, but it also allows the monitoring of the long-time temperature development and a detection of further parameters of underground gas accumulators. The obtained thermodynamic information supply in connection with the geological conditions of the underground a detailed picture of the processes in the gas accumulator. By determining the temperature profile also in the accumulator bore, the pressure profile in the accumulator can be calculated based on the knowledge of the pressure at the probe head and by using the thermodynamic state equation for the gas from the temperature profile.

The coolings in the annular space or the cementation shown in FIG. 2 have a backwards effect into the ascending or supply pipe by means of heat conduction processes and can be detected and located with the fiber-optic temperature sensing mechanism by using the sensor cable.

It has shown during tests that it is possible to perform a temporary installation of the sensor cable in the bore of a gas accumulator, even when the bore itself is under pressure. For this purpose a sealing of the bore during the cable installation and during the time of the temperature measurements is performed by means of pressed air locks. After determining the initial state of the temperature distribution either the pressurized annular space or the ascending pipe is relieved. Thereafter the temperature distribution is measured anew. On the basis of the temperature differences leakages and defect parts can then be determined by taking into account the known piping scheme. It could be proved that leaky sleeves entail temperature reductions of several degrees. As is illustrated, a slightly deeper arranged packer sealing the annular space against the gas accumulator could be located as being defect at a different time.

Accordingly it is possible with the device described above by means of FIG. 2 to determine leakages especially in ascending or supply pipes for underground gas accumulators in a particular cost-efficient manner and/or to perform a long-time monitoring of underground natural gas storages or compressed air storages. Due to the fact that the applied fiber-optic sensor cables are free of potential, dangers are excluded and the desired explosion safety is guaranteed.

The results obtained from the measuring unit for feeding radiation impulses and for receiving Raman backscatter radiation can be evaluated online and mobile or they can be incorporated in a control room for condition monitoring.

Figure 3:
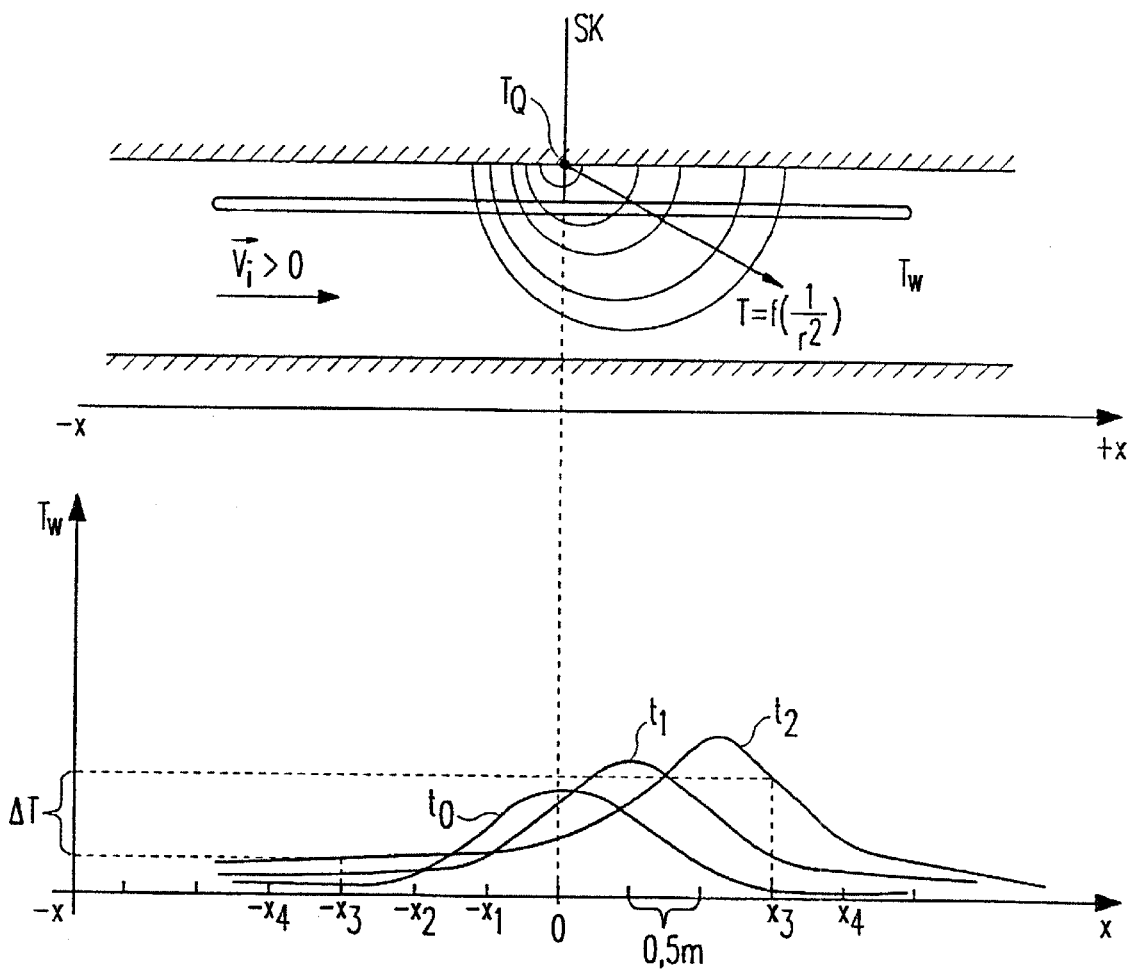
FIG. 3 shows a basic illustration of an arrangement of a thermal point source and a fiber-optic sensor cable in an underground drift for determining a flow and examplarily determined temperature profiles.

By means of FIG. 3 and the following embodiment is will be explained how with the aid of fiber-optic sensing mechanisms flows in excavation waters can be detected, and how it is possible to determine the behavior of a watershed.

In the present case, the flow direction of the excavation water in a flooded drift section being completely filled with water is to be detected and the flow rate is to be determined.

According to the invention a thermal point source having a temperature Tq is assumed and a distributed temperature measurement at the pit is to be realized. For the distributed temperature measurement a fiber-optic sensor cable SK is provided in the drift section so as to allow a measurement with a local resolution as high as possible.

The point source is subjected to a time limit when having the effect of a thermal impulse. By considering the common heat conductivity of water, flow rates in the range of 0.2 to 0.8 and more m/h can be determined, wherein the temperature of the point source can be adjusted correspondingly if a higher flow rate is detected.

The measuring route, i.e. the laying direction of the sensor cable SK, preferably lies in the longitudinal direction of the drift, i.e. in x-axis direction. As can be seen in the figure, the temperature curve is shifted after having applied the point source in the case of an existing flow, wherein the fiber-optic measuring system is able to detect both the flow direction and the flow rate by means of the shifting of the profiles.

The applied thermal point source Tq can generate heat as well as a purposive cooling of the excavation water.

Therefore, according to the invention the knowledge is used that in the case of clear flow processes the thermal expansion being isotropic as such is shifted with a corresponding homogeneous field. The shifting of the thermal field can be determined with the fiber-optic temperature measuring technique, whereby again the flow direction and the flow rate of the flowing medium can be determined.

A further specific application of the inventive fiber-optic temperature sensing mechanism resides in the determination and proof of the tightness of base sole and lateral walls of building excavations or similar installations.

For locating leakages in the base sole of building excavations a plurality of bores having a pre-specified diameter is inserted directly down to the base sole in a grid adjusted to the geometry of the building excavation. Temperature measuring probes are then inserted into the bores, and the surface-like distribution of the temperature is determined. For this purpose all sensors can be read out simultaneously, or it is also possible to activate selected sensors forming a coarse grid first, in order to detect assumed leakage locations in a coarse manner. Subsequently thereto areas, which can be pre-selected, can be measured with a narrower dot matrix in a compressed manner.

Concerning the detection of leakages in sheet pilings or subterraneous curtains, the determination of the vertical temperature distribution requires a local resolution of approximately 0.5 to 1 m in order to detect the leakage as exactly as possible. For this purpose, too, a fiber-optic temperature measuring method is used. In the concrete case the fiber-optic temperature measuring cable is installed in bores in the direct proximity of the sheet pilings or subterraneous curtains in front of the joints between the individual wall elements of a building excavation. In other words, at critical impact spots the insertion of the bores is preferably performed with a sensor cable.

Said bores inserted directly down to the base sole preferably have an inner diameter of at least 1 to 1.5" and can be tubed in a continuous manner with a glass fiber reinforced plastic filtering tube or similar filtering tubes.

Figure 4:
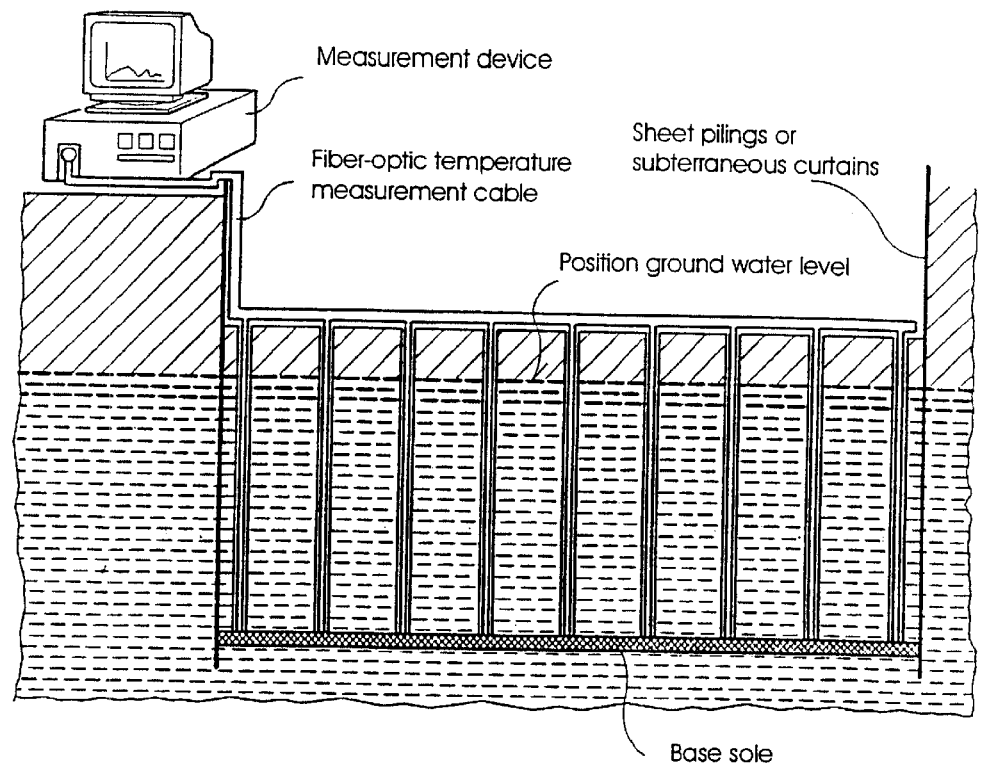
FIG. 4 shows a basic arrangement of a temperature measurement cable laid in a building excavation in front of the vertical wall.

With a medium depth of the bores of 17 m and a distance of the bores to each other of 4 m, up to 100 bores can be equipped with a continuous cable, as is, for instance, shown in FIG. 4.

The laying of the measuring cable is pre-fabricated such that the cable need only be uncoiled from a cable drum in the building excavation, and that the cable loops provided with basic weights can be passed through the sunken bores.

Upon the installation of the measuring cable the initial state of the temperature distribution in the building excavation is determined during a time period of, for example, 30 min. Thereafter, it is started to pump the water out of the interior of the building excavation. During the pumping the change of the temperature distribution relative to the initial state before the start of the pumping is determined in a pre-specified cycle.

Controlling interferences can be performed by means of an online data evaluation directly after the actual measuring process, i.e. already during the pumping attempt. In other words, the pumping rate and the duration of the pumping-off phase can be influenced.

Cooler ground water flows in subsequently at leaky spots of the sheet pilings, and a corresponding local temperature change is detected. By means of a common locally resolved measurement the position of the leakage can then be determined allowing for reparation.

Figure 5:
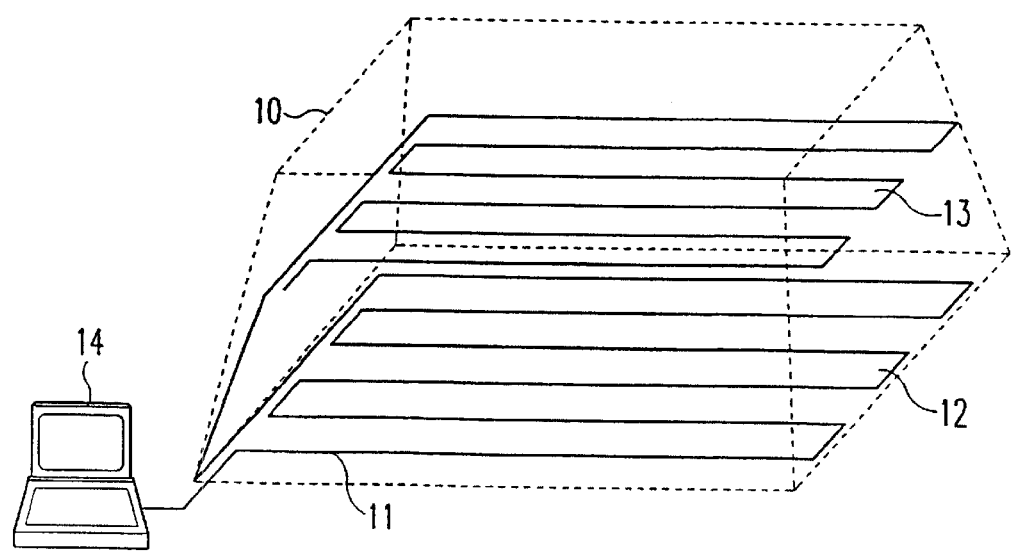
FIG. 5 shows the basic illustration of the arrangement of sensor cables in a leaching dump.

As is illustrated in the embodiment according to FIG. 5 the application of a fiber-optic temperature measuring method for monitoring exothermal, chemical and/or microbiological leaching processes can be realized, wherein the temporal and local temperature distribution is determined by means of meander-shaped fiber-optic sensors provided in the leaching material, which are preferably arranged in several levels. The leaching activity and the yield can be determined, but also controlled, on the basis of the known chemical or microbiological process.

According to FIG. 5 a fiber-optic measuring device in the form of, for instance, meander-shaped laid sensors 11 is formed in the interior of leaching dump 10. It is thereby possible to arrange the sensors 11 in a first level 12 and in a second level 13 located on top thereof in a planar manner.

The cables guided to an evaluating device 14 can then be subjected to laser light in the above-described manner in order to allow the determination of the temperature distribution locally and temporally on the basis of the Raman backscatter effects.

The described preferred arrangement of the sensor cables 11 makes it possible to examine the forming continuous leaching front inside the leaching dump 10 and to evaluate it in view of its homogeneity. By the purposive addition of specific materials, which enhance the leaching process, the yield can totally be increased.

The long-time monitoring moreover provides the possibility to estimate the relaxation process inside the leaching dump once the exothermal reaction has expired, in order to shift the dump thereafter or to initiate a new leaching cycle.

Due to their construction as enveloped optical waveguides the fiber-optic sensors are particularly resistant against the critical and aggressive environmental conditions inside a leaching dump. The sensor cables are, for example, inserted in the manner shown in FIG. 5 when the leaching dump 10 is filled, where they can remain during the whole yielding cycle. The measurements performed by means of the evaluating device 14 can be repeated continuously, but also at intervals, i.e. cyclically, in order to guarantee the desired control or influencing, respectively, of the leaching yield.

List of Reference Numbers 1 ascending or supply pipe
2 annular space
3 fiber-optic sensor cable
4 sleeve
5 weighted body/cable terminal box
6 packer
7 spacer
10 leaching dump
11 sensor cable
12 first sensor cable level
13 second sensor cable level
14 evaluating device

What is claimed is:

1. Device for monitoring a temperature distribution or temperature anomalies of at least one pipe surrounded by an annular space for underground gas accumulators in a longitudinal direction of the at least one pipe, wherein the at least one pipe is in the form of an ascending pipe or a supply pipe, the device comprising:

a fiber-optic sensor cable freely suspended in an interior of the pipe;

the fiber optic sensor cable having an outer end passed via a pressure-proof sealing to an exterior of the at least one pipe;

a measuring unit for feeding radiation impulses and for receiving a Raman backscatter radiation, wherein the outer end is connected to the measuring unit;

a device for a temporary relief of pressure in at least one of the annular space and the pipe, wherein a first temperature profile is determined before the temporary relief of pressure and a second temperature profile is determined after the temporary relief of pressure, and wherein leakage is evaluated based on a difference between the first and second temperature profiles.

2. Device according to claim 1, wherein the fiber-optic sensor cable has an inner end having attached thereto at least one of a weighted body and a cable terminal box.

3. Device according to claim 1, further comprising spacers connected to the fiber-optic sensor cable, wherein the spacers secure a pre-specified position of the fiber-optic sensor cable in the interior of the pipe upon insertion of the fiber-optic cable into the pipe.

4. Device according to claim 3, wherein the spacers are springy and have a relaxed state in which the spacers extend perpendicularly relative to a longitudinal axis of the fiber-optic sensor cable.

5. Device according to claim 1, wherein, for evaluating leakage, a differential curve is determined based on the first temperature profile before the temporary relief of pressure in the annular space and the second temperature profile after the temporary relief of pressure in the annular space, wherein negative temperature differences of the differential curve indicate a leaky sleeve of the pipe and positive temperature differences of the differential curve indicate incoming gas hotter than a gas in the annular space in a rear pipe area due to a defect in cementation of the pipe.

* * * * *